July 19, 1966　　　　H. C. FLINT　　　　3,261,642
UNISON ACTION SEAT

Filed Sept. 26, 1963　　　　　　　　　　7 Sheets-Sheet 1

INVENTOR.
Hyland C. Flint
BY
Barnes, Dickey & Pierce
ATTORNEYS

July 19, 1966 H. C. FLINT 3,261,642
UNISON ACTION SEAT
Filed Sept. 26, 1963 7 Sheets-Sheet 2
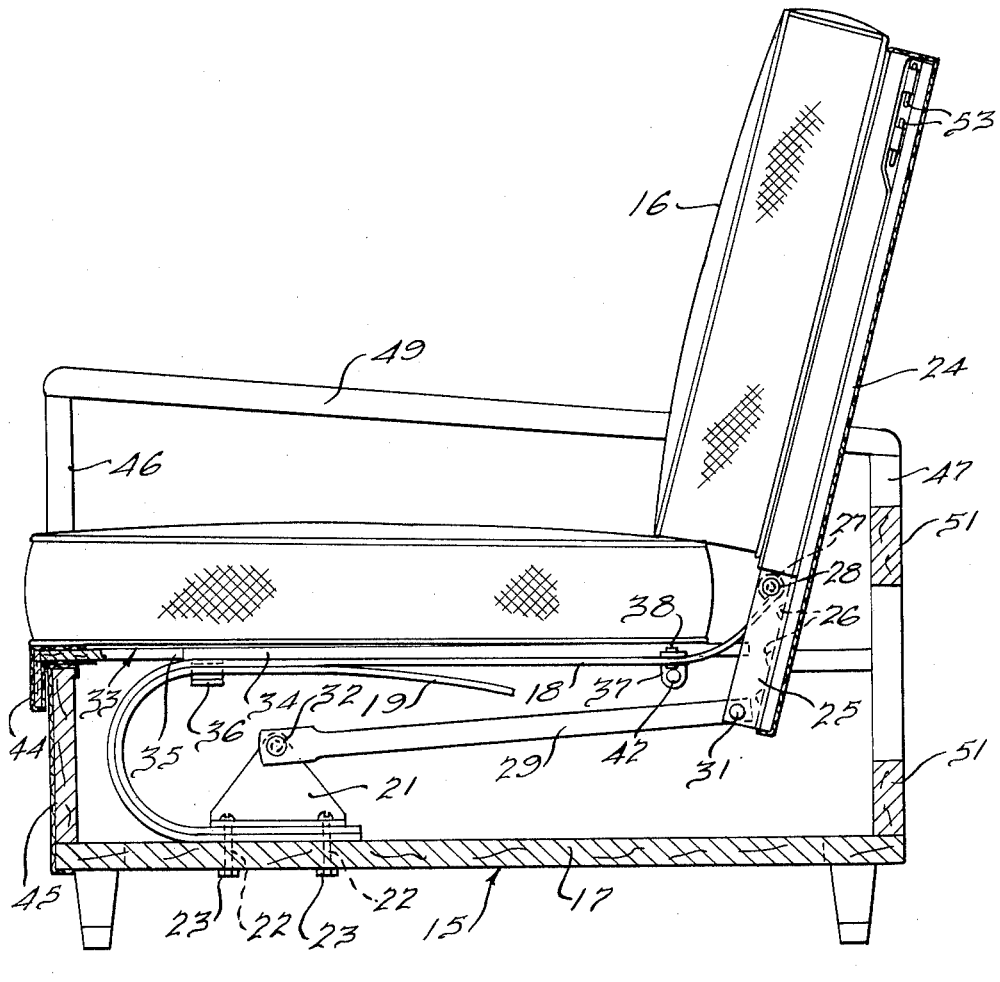
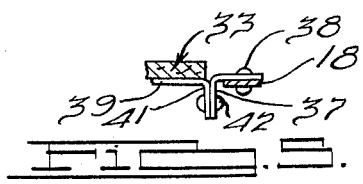
INVENTOR.
Hyland C. Flint.
BY
ATTORNEYS.

July 19, 1966  H. C. FLINT  3,261,642
UNISON ACTION SEAT
Filed Sept. 26, 1963  7 Sheets-Sheet 3
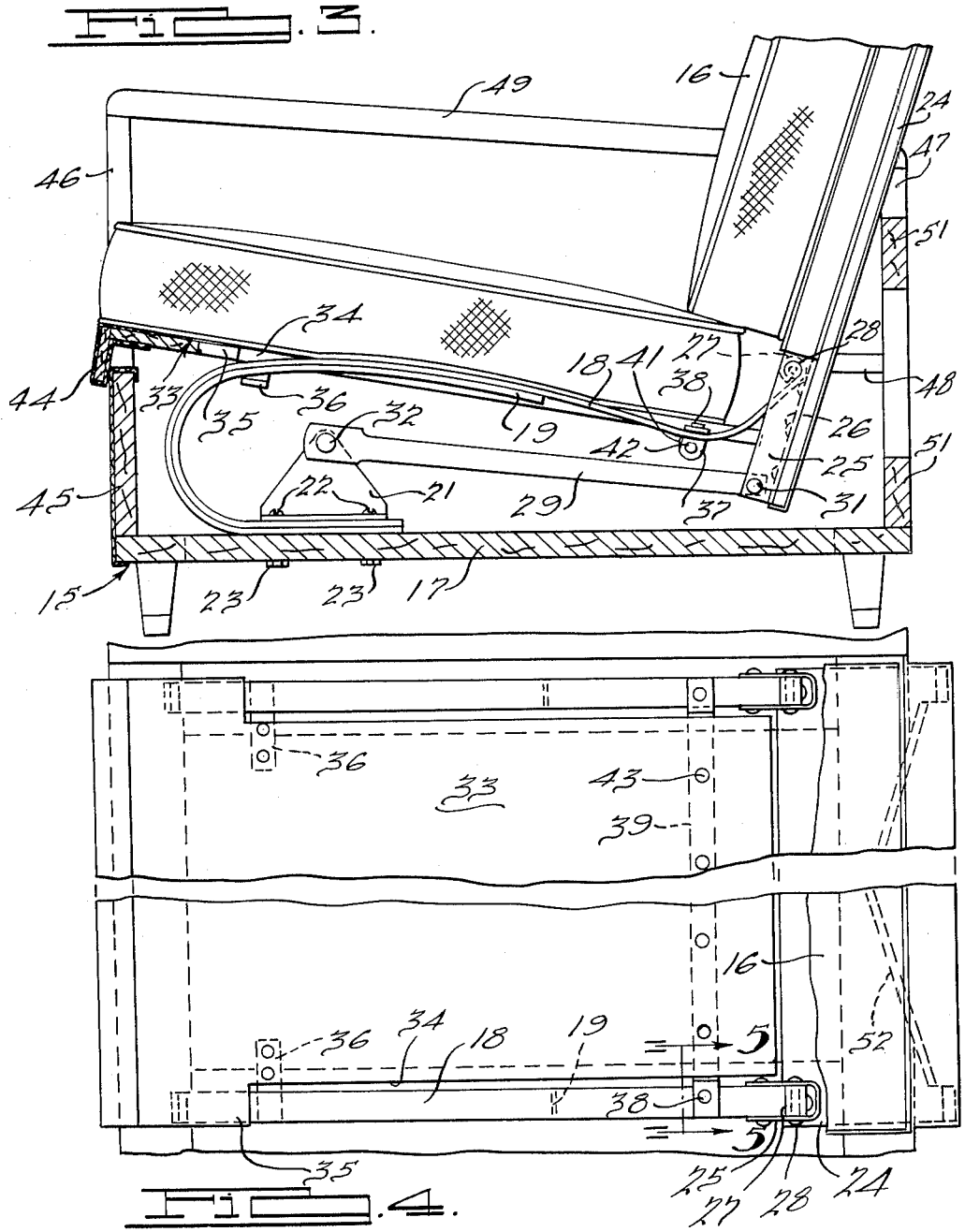
INVENTOR.
Hyland C. Flint
BY
Harness, Dickey & Pierce
ATTORNEYS

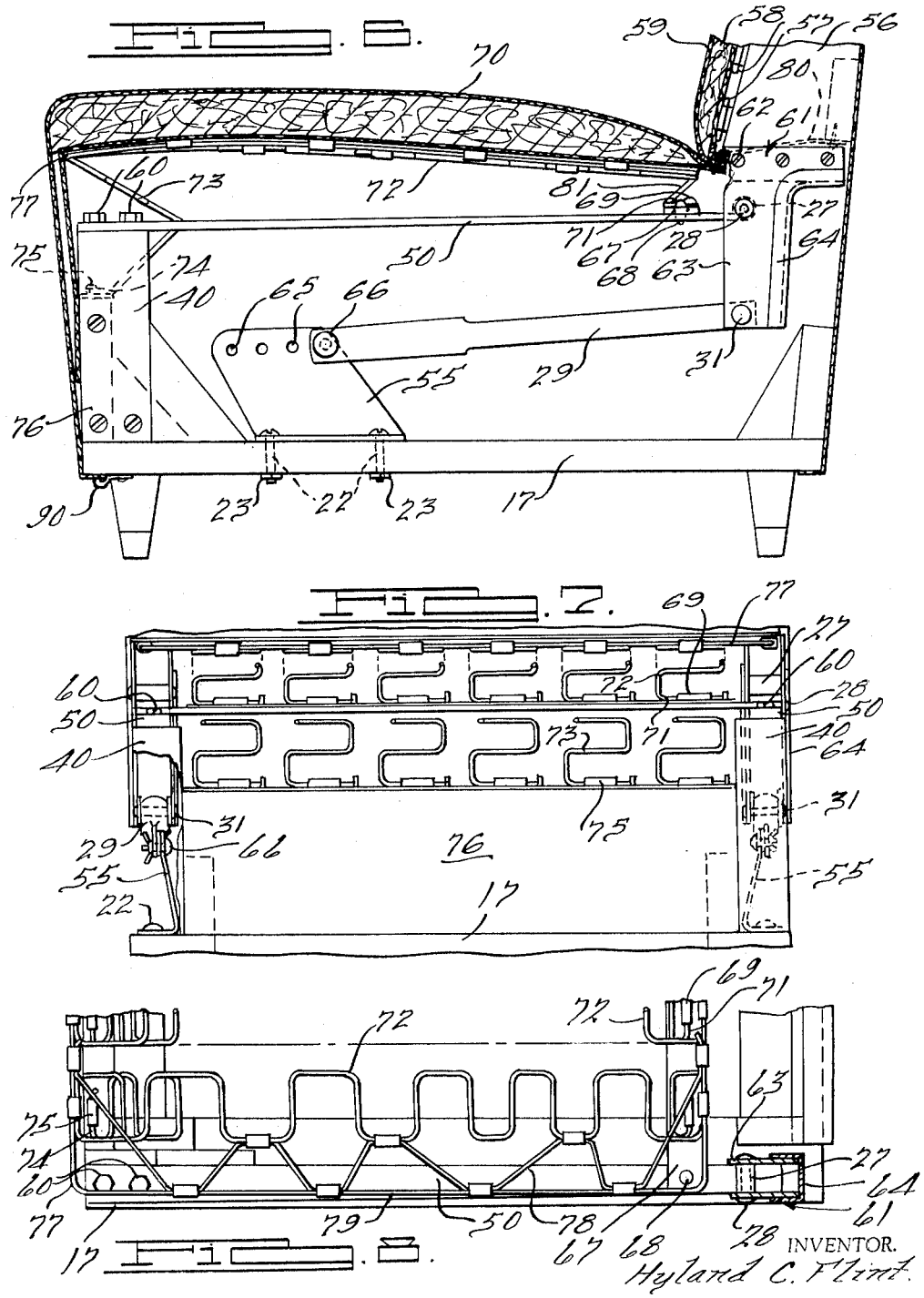

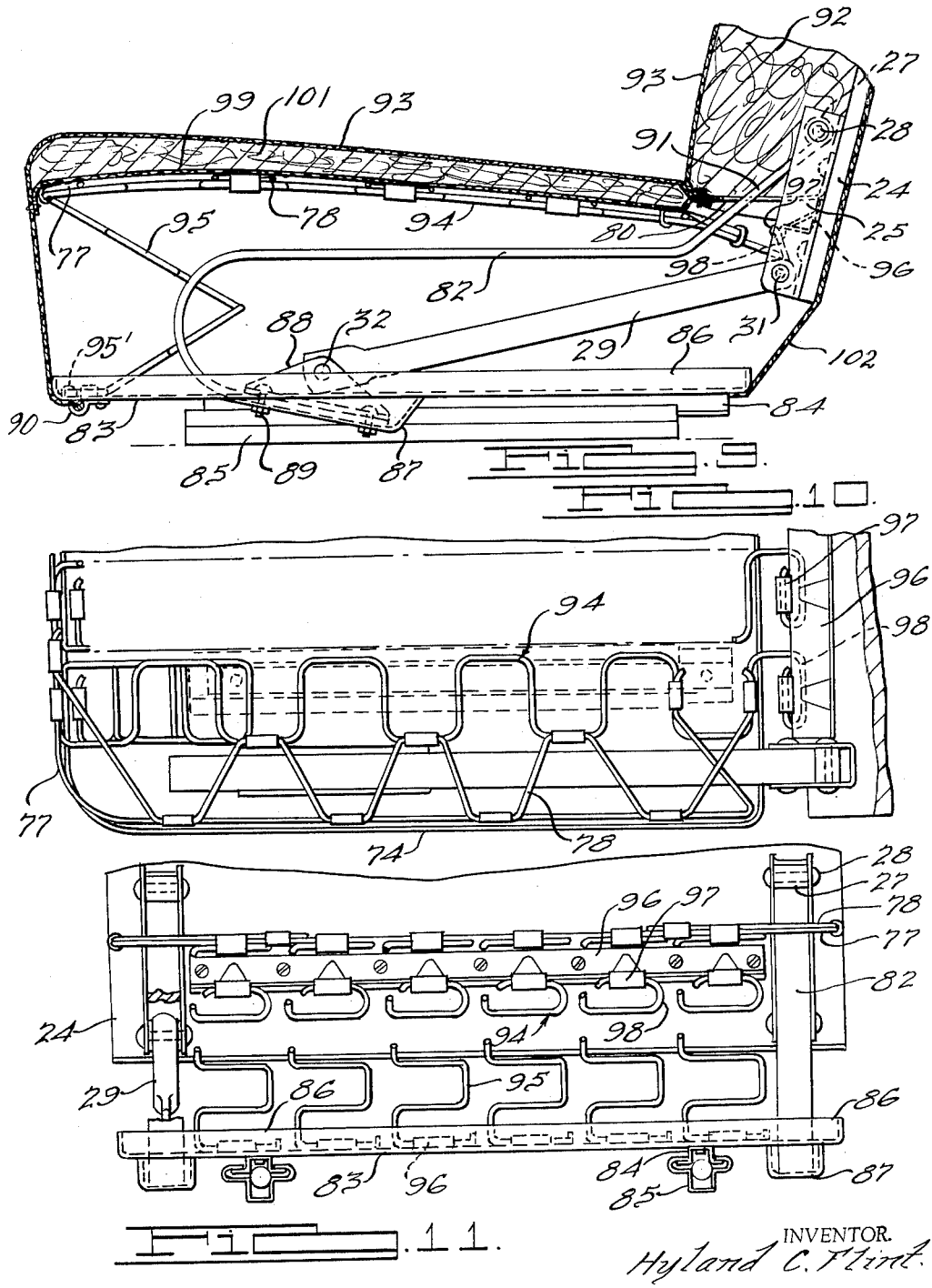

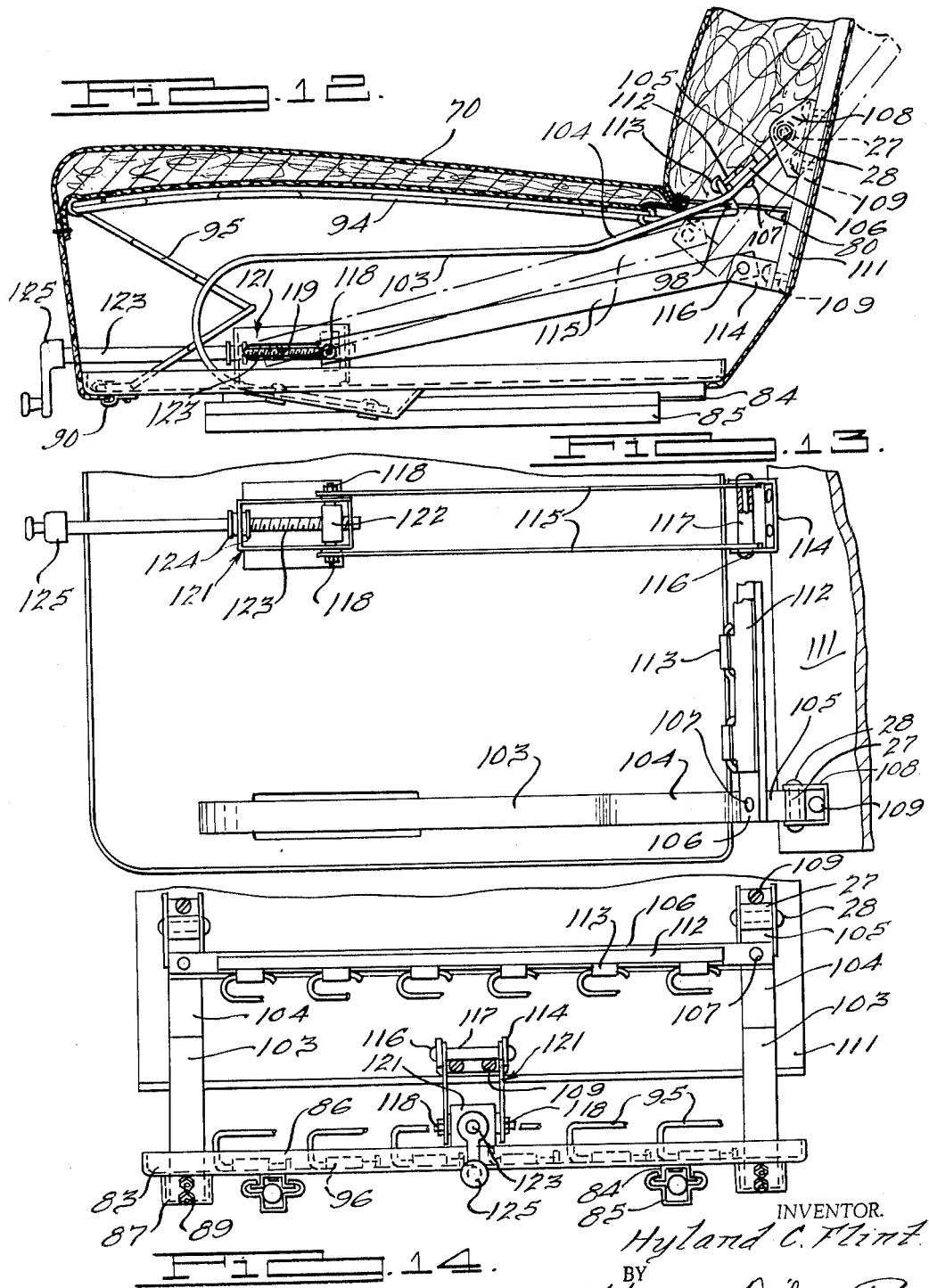

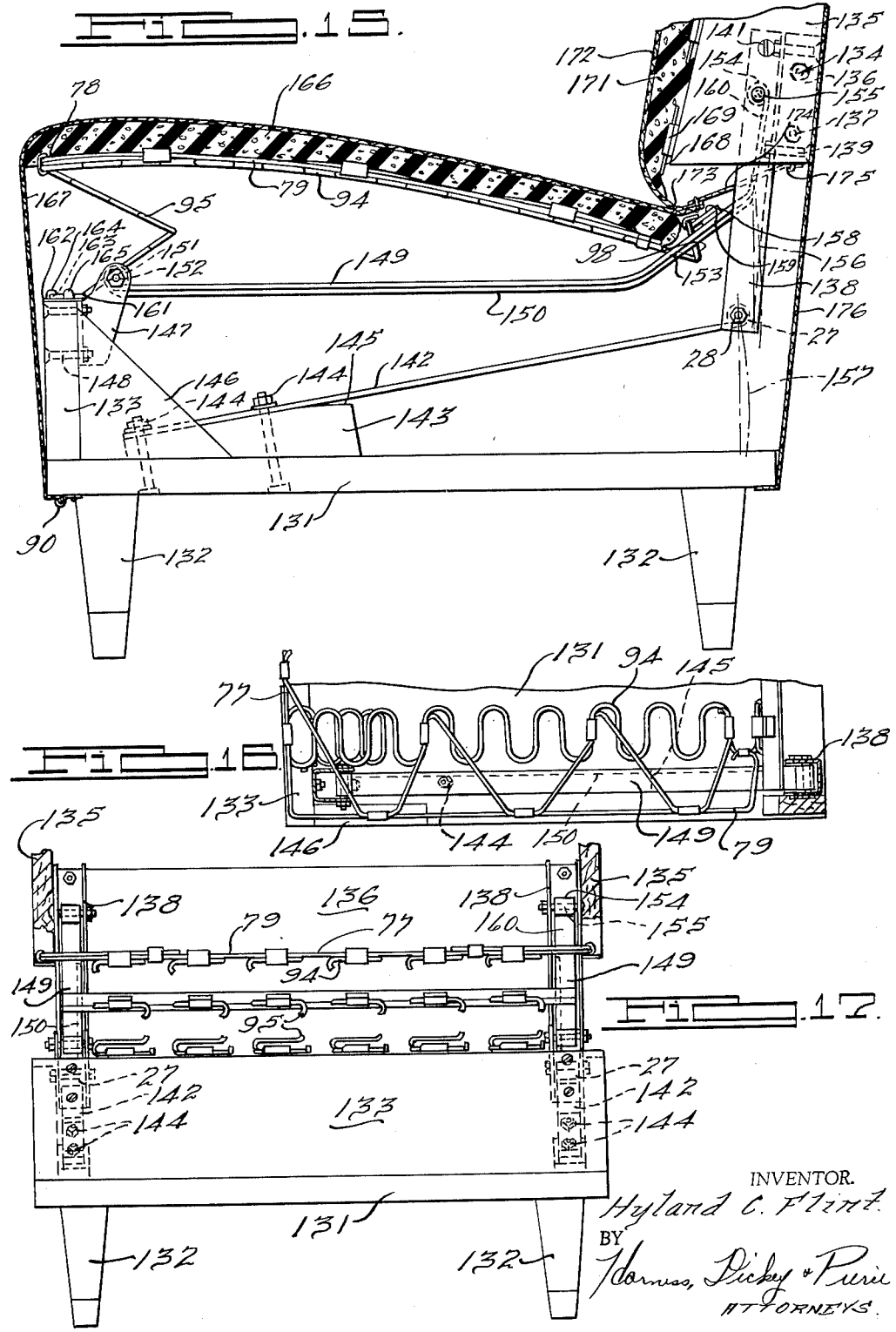

United States Patent Office 3,261,642
Patented July 19, 1966

1

3,261,642
UNISON ACTION SEAT
Hyland C. Flint, 3551 Walnut Lake Road,
Orchard Lake, Mich.
Filed Sept. 26, 1963, Ser. No. 311,738
20 Claims. (Cl. 297—309)

This invention relates to seat construction and particularly to a seat in which the back and seat cushion move as a unit on a support mounted therebeneath.

Various structures have been employed heretofore in the art to provide a unison action to the seat and back cushion on the base structure. The arms of the chair were employed for supporting the springs and the links which controlled the position of the back cushion when the seat and back cushions were deflected as a unit. Such structures were inadequate when each unit of a davenport, for example, was individually mounted for unison action of the cushion units.

The present invention pertains to supporting mechanism for the seat and back cushions which are mounted beneath the seat cushion, independent of the arms or other side and back portions of the base structure. A base frame is provided with or without arm rests having a pair of leaf springs secured at one end to the base frame while the other end extends rearwardly thereabove and pivoted to the bottom portion of the back frame. A pair of brackets are supported on the base frame to which a pair of links are pivoted having the other ends pivoted to the bottom of the back frame for controlling its tilted position. A second pair of leaf springs may be secured to the first said leaf springs for picking up the load on the first leaf springs to control the amount of deflection as the load is increased. A platform may be secured across the leaf springs by employing clips at the front end which permit the platform to tilt on pivotal brackets at the rear end which are fixed to the rear end of the leaf springs. Platforms are employed when loose cushions are used on the davenport, sofa or chair, and spring frames are substituted for the platform when springs are employed for the seat and back cushion.

Accordingly, the main objects of the invention are: to provide unison action to a seat and back cushion on supporting mechanism mounted below the seat cushion; to secure leaf springs on the base frame of a seat for supporting a pivoted seat and back frame for unison action; to support pivoted seat and back frames on leaf springs secured to a base frame with the bottom of the back frame connected by a link to the base frame; to support a platform for a seat on a pair of leaf springs for pivotal movement as it is deflected with the leaf springs; to employ leaf springs on a base frame for supporting a back cushion for vertical movement having across the leaf spring a support for the rear ends of sinuous spring strips the front end of which are secured on the front end of the base frame; to pivotally support a back cushion frame on the ends of spaced leaf springs and guide the frame during vertical movement by links pivoted thereto and to the base frame and located beneath seat cushion frame which is pivoted to the back cushion frame and to the front of the base frame, and in general, to construct a unison action seat which is self supported on a base frame, which is simple in construction and positive in operation.

Other objects and features of novelty of the invention will be specifically pointed out or will become apparent when referring, for a better understanding of the invention, to the following description taken in conjunction with the accompanying drawings, wherein:

FIGURE 1 is a broken view in elevation of a davenport having seating sections thereon embodying features of the present invention;

2

FIG. 2 is a sectional view of the structure illustrated in FIG. 1, taken on the line 2—2 thereof;

FIG. 3 is a view of the structure illustrated in FIG. 2, when in deflected position;

FIG. 4 is a broken plan view of the structure illustrated in FIG. 2;

FIG. 5 is a broken sectional view of the structure illustrated in FIG. 4, taken on the line 5—5 thereof;

FIG. 6 is a view of structure, similar to that illustrated in FIG. 2, showing another form of the invention;

FIG. 7 is a broken front view of the structure illustrated in FIG. 6;

FIG. 8 is a plan view of one side of the structure illustrated in FIG. 7, with parts in section;

FIG. 9 is a view of structure, similar to that illustrated in FIG. 6, showing still another form of the invention;

FIG. 10 is a broken plan view of the structure illustrated in FIG. 9;

FIG. 11 is a broken front view of the structure illustrated in FIG. 9;

FIG. 12 is a view of structure, similar to that illustrated in FIG. 9, showing a further form which the invention may assume;

FIG. 13 is a broken plan view of the structure illustrated in FIG. 12;

FIG. 14 is a broken front view of the structure illustrated in FIG. 13;

FIG. 15 is a view of structure, similar to that illustrated in FIG. 6, showing a further form which the invention may assume;

FIG. 16 is a broken plan view of the structure illustrated in FIG. 15; and

FIG. 17 is a broken front view of the structure illustrated in FIG. 16.

Figure 1:
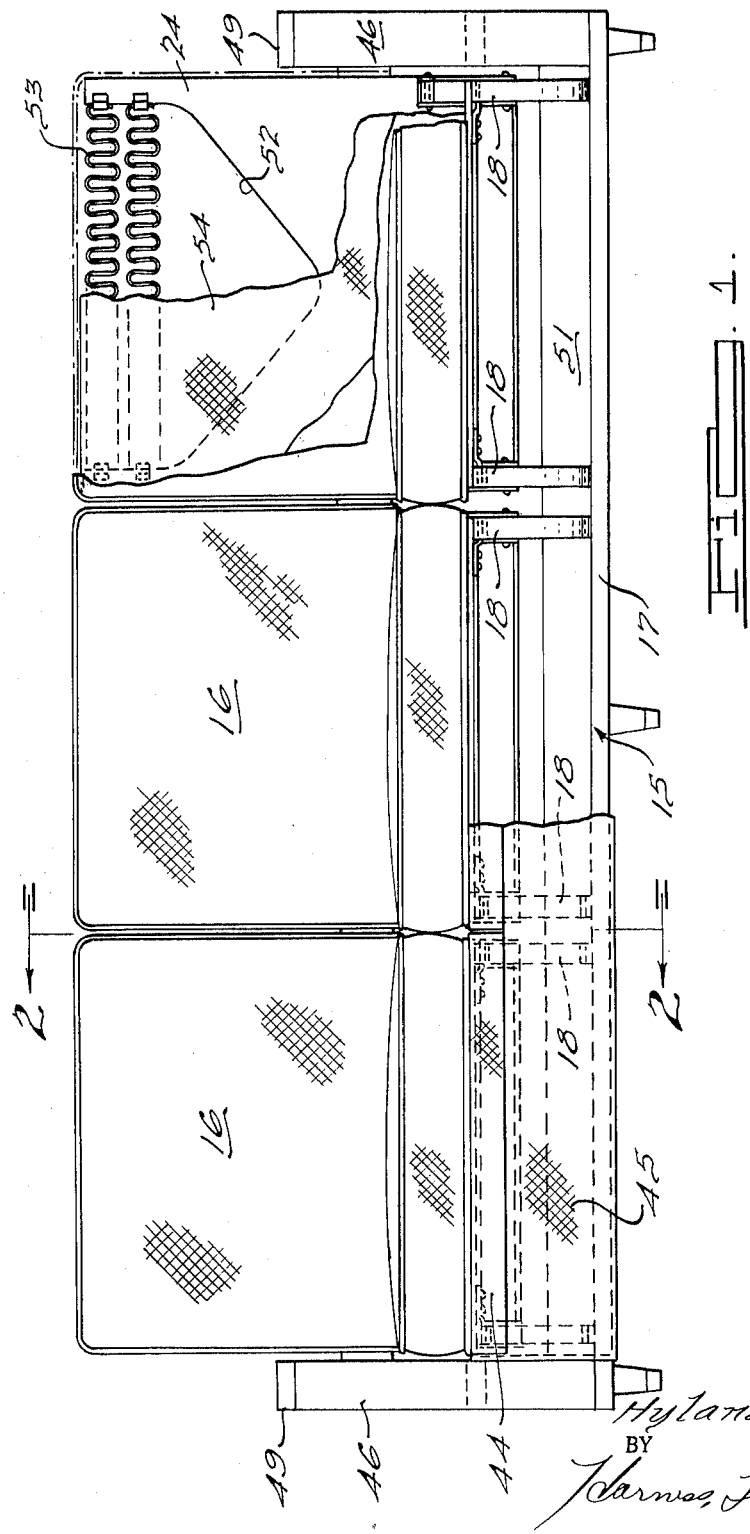

Referring to FIGS. 1 through 5, an embodiment of the invention is illustrated as being applied to a davenport but it is to be understood that the invention may be applied to a chair, sectional davenport or the like having individual sprung seating units thereon. The davenport 15 has three like sections 16 mounted on a base frame 17 for independent movement. Since all of the sections are the same only one of the sections will be described in detail.

A pair of U-shaped leaf springs 18 are mounted in spaced relation on the base frame 17 with an inner U-shaped helper spring 19 mounted within the spring 18. A flanged bracket 21 has bolts 22 extending therethrough and through one leg of the U-shaped springs 18, 19 and the base frame 17 secured by nuts 23. A platform 24 forms the back support having channel elements 25 at the lower bottom corners secured by bolts or screws 26 thereto. The ends of the leaf springs 18 extend upwardly and are reversely bent to form an eye 27 disposed in the channel elements 25 and secured by rivets 28 to pivotally support the platform 24 on the ends of the pair of leaf springs 18. A pair of links 29 are pivoted to the lower ends of the channel elements 25 by rivets 31. The opposite ends of the links 29 are secured to the bracket 21 by rivets 32. A seat platform 33 has recesses 34 at the sides to clear the leaf spring rearwardly of the extending front portions 35.

The extending portions 35 rest upon the leaf springs 18 at the end of the upper loop portion and pivots thereon. Fingers 36 are secured to the platform to project under the upper arm of the springs 19 with clearance therebetween to permit the pivoting of the ends 35 without binding. A bracket 37 is secured to the rear end of a leaf spring 18 by rivets 38. A platform supporting strip 39 has its ends bent downwardly at 41 and secured by rivets 42 to the brackets 37 in pivotal relation thereto. The rear end of the platform 33 is secured by screws or bolts 43 to the supporting strip 39 which will pivot relative to the leaf springs 18 when the latter are deflected.

A strip of wood or other material 44 is secured to the forward end of the seat platform 33 to provide a trim strip therefor to extend over and cover the top of the base frame element 45 when the platform is tilted. The base frame 17 has upstanding elements 46 at the front corners and elements 47 at the rear corners interconnected by a brace member 48 and an arm rest 49. The upstanding elements 47 at the rear corners are interconnected by brace members 51 forming an open area in which the platforms 24 are free to move independently of each other and the base frame.

The back platform 24 has a cutout portion 52 at the top across which a plurality of spring strips 53 are secured. This provides a soft edge to the top of the platform and when only two strips 53 are employed, a heavy fabric material 54 is stretched thereover. It is to be understood, however, that the entire cutout area 52 or a cushion frame may be sprung with the sinuous spring strips 53. With this arrangement a single seat, a two or three seat davenport or sectional furniture units may be made up with any number of seating areas, each one of which has independent unison action. The amount of deflection relative to load is controlled by the use of the second set of leaf springs 19 which permits a light load to have substantial unison action which only slightly increases when the seat is subjected to a heavy load.

In FIGS. 6, 7 and 8, a further form of unison action seating is illustrated that wherein the base frame 17 has a pair of posts 40 extending upwardly at the front corners on which leaf springs 50 are secured by screws 60. A pair of brackets 55 are secured to the base frame by bolts and nuts 22 and 23. A back cushion frame 56 of conventional form has a plurality of sinuous springs 57 extending thereacross with padding 58 and trim material 59 disposed thereover. The back cushion tapers to the top to provide a thin edge which is padded to form a soft edge for the top of the cushion. L-shaped channel brackets 61 are secured to the bottom ends of the side members of the back cushion frame 56 by screws 62. The brackets 61 are made of two side pieces 63 and an L-shaped channel portion 64 which are secured together as a unit to simplify manufacture. The eyes 27 on the end of leaf springs 50 are secured within the channel of the brackets 61 by rivets 28. Links 29 are secured within the bottom of the channel brackets 61 by rivets 31, the opposite end being selectively disposed in apertures 65 of the brackets 55 by a bolt and thumb nut 66. A strap 67 is secured by rivets 68 across the leaf springs 50 near the eye end thereof to form a support for clips 69 which secure the ends 71 of sinuous spring strips 72 to the strap 67 for vertical movement therewith. The front end of the spring strips 72 have a V-shaped supporting portion 73 containing an end 74 resting on and secured to clips 75 on the front rail member 76 of the frame. A border wire 77 joins the spring strips together at the junction of the top load supporting portion and the V-shaped supporting portion 73. An arch or filler strip 78 is secured between the endmost spring strips 72 and the side portions 79 of the border wire, as clearly illustrated in FIG. 8. With this arrangement the sprung cushion has the rear end supported on the rear end of leaf springs 50 to move upwardly and downwardly therewith and with the back cushion frame 56. Padding and trim material 70 is applied over the spring strips 72 secured at the rear to the back cushion trim material 56 and to the listing strip 80 which is secured to the back cushion frame 56. The front bottom edge of trim material 70 is secured beneath the bottom of the base by the C-shaped strip 90.

The angular position of the seat back relative to the cushion is changed by changing the bolt 66 in an aperture 65 of the bracket 55. In whatever inclination the seat back is disposed, it will move upwardly and downwardly without substantially changing its position relative to the vertical. By having a Z-portion 81 at the rear end of the spring strips 72, a soft edge is provided along the rear of the load bearing portion of the seat cushion. The leaf springs 50 slightly taper in both thickness and width toward the eye ends thereof.

Referring to FIGS. 9, 10 and 11, a still further form of the invention is illustrated, one which may be used in a davenport, single chair or in an adjustable seat of the automotive vehicle type. In this arrangement a metal pan 83 is secured to spaced track elements 84 which operate with floor engaging track elements 85 to permit fore and aft movement. It is to be understood that the track elements may be of a type which also raises and tilts the seat to any desired position. The pan 83 has an edge flange 86 and depressed areas 87 to provide strength thereto. The depressed areas 87 have a sloping bottom to which the short end of leaf springs 82 are secured along with brackets 88 by bolts 89. A back platform 24 has the channel elements 25 screwed or bolted thereto to which the links 29 are secured by pivots 31, the opposite end being secured to the brackets 88 by pivots 32. Because of the shallowness of the seat, the upper legs of the leaf springs 82 have an angular disposed section 91 with an eye 27 on the ends which is secured to the upper part of the channel elements 25 by rivets 28. The platform 24 has a resilient surface produced either by a block of foam rubber 92 or by padding material on a spring base which is covered by a trim material 93. Sinuous spring strips 94 have a V-shaped front supporting portion 95 with ends secured in clips 95' along the front edge of the bottom pan 83. A supporting strip 96 is secured to the back panel 24 between the channel brackets 25 having spring supporting portions 97 along the forward end to which the end of the forwardly extending rear loops 98 of the strips are secured for the purpose of resisting the rearward movement of the top load supporting portion of spring strips 94 when loaded.

The front edge of the spring strips are interconnected by a border wire 77 and the space between the side portions 79 of the border wire and the endmost spring strips 94 are bridged by the arch or filler strip 78 in the manner as pointed out hereinabove with regard to the structure of FIGS. 6, 7 and 8. This arrangement provides a shallow seat having unison action to the back and seat cushion while maintaining toe room for the occupant of the rear compartment of the vehicle body. The pivoting of the back cushion on the leaf springs 82 controlled by the links 29 maintains a vertical movement to the back when the seat and back are deflected under load. The spring strips 94 are preferably covered by an insulator 99, a foam pad 101 and trim material 93. The back trim material 102 bridges the bottom of the back and the rear edge of the pan 83 to trim the area therebetween without interfering with the downward movement of the back cushion.

In FIGS. 12, 13 and 14 a still further form of seat structure is illustrated which is similar to that of FIGS. 9, 10 and 11. In this arrangement, a pair of leaf springs 103 has two angular sections 104 and 105 at the rear end, the latter of which is spanned by a spring supporting strip 106 and secured thereto by rivets 107. The ends of the leaf springs 103 have eyes 27 thereon which are secured by rivets 28 to brackets 108 attached to a panel 111 by bolts 109. A strip 112 having loops 113 thereon is secured to the strip 106 with the loops 113 supporting the ends of the end loops 98 of the spring strips 94 for pivotal movement. The spring strips 94 are connected by the border wire 77 and arches 78 in the same manner as pointed out above with regard to the structure of FIGS. 6 to 11.

The bottom corners of the back panel 111 have U-shaped clips 114 secured thereto to which a pair of links 115 are pivotally secured by rivets 116 and spaced apart by tubes 117 through which the rivets extend. The opposite ends of the links 115 are secured to studs 118 which project through slots 119 in a rectangular supporting frame 121. The studs extend from a nut 122 which is threaded upon the threads of a lead screw 123 which extend through end walls of the frame and is retained against end movement by washers 124. The front end of the lead screw has a crank handle 125 thereon by which the nut is moved backward and forward to thereby adjust the bottom end of the platform 111 about the supporting pivots 28 to tilt the back cushion to a desired position while maintaining unison action of the seat and back cushions. The seat is mounted on the track elements 84 and 85 for fore and aft movement and it is to be understood that any of the seats could be mounted on base platforms of the swivel or other types if desired.

In FIGS. 15, 16 and 17, a still further form of the invention is illustrated which is similar to that of the foregoing figures but which has the supporting spring and the guiding link in reverse positions. A base 131 is supported on legs 132 having an upright frame member 133 secured across the front edge and secured by brace members 146. A back frame member 134 has tapered side members 135 interconnected by cross members 136 secured thereto by dowels 137. Two channel members 138 are secured to the back frame bottom cross member 136 by bolts 139 and to the side members 135 by the bolts 141.

A pair of leaf springs 142 have the eyes 27 secured within the channel elements 138 near the bottom thereof by bolts 28. Each of the leaf springs 142 is secured to a side edge of the base 131 on sloping blocks 143 by bolts 144. While a leaf spring section may be employed herewith the leaf spring 142 for controlling the deflection of the back and seat cushions, the same result is obtained by extending the block 143 and have it arch downwardly as at 145 to pick up the deflection of the spring 142 when the seat is excessively loaded. The front frame member 133 has U-shaped brackets 147 secured near the ends by bolts 148. A pair of guide links 149 have an eye 151 on one end which is secured by bolts 152 to the extending end of the brackets 147. The opposite end of the guide link 149 is bent upwardly at 153 and vertically at 160 and provided with an eye 154 which is secured within the channel elements 138 in the upper part thereof by bolts 155. The bolt 155 travels along an arc 156 and the bolt 28 moves along an arc 157 to maintain the back frame in the same vertical position. The guide links 149 may be made of spring steel with a side flange 150 which prevents it from bending except for the vertically extending end portion 160 which deflects to permit the back to be rocked by an occupant when applying pressure thereto.

A stirp 158 is riveted, welded or otherwise secured across the angular portions 153 of the pair of guide links 149 having spring end supporting clips 159 thereon. Sinuous spring strips 94 have the loop on the end of the V-shaped front supporting portion 95 secured on a strip 162 attached to the top of the frame member 133. The end 163 of the loop 161 extends within a tunnel 164 where it is locked in position by a struckup tongue 165 when the loop rests upon the strip 162. The forwardly sloping rear loop 98 of the spring strips are secured in the clips 159 and resist the rearward movement of the top load-supporting portion of the spring strips when loaded.

The front edge of the top load-supporting portion of the spring strips are interconnected by a border wire 77 and the spaces between the side portions 79 of the border wire and the endmost spring strips 94 are bridged by an arch or filler strip 78 in the manner as pointed out hereinabove with regard to the structures of FIGS. 6, 7, and 8. A foam rubber cushion pad 166, or other type of padding material, is applied over the spring strips 94 covered by a trim material 166. A plurality of sinuous springs 168 are secured across the back frame members 135 by having the ends secured in clips 169 which are secured to the forward edge of the members. A foam rubber pad 171, or other padding material, is applied to the back spring strips 168 and covered by a trim material 172. The trim material is applied to the bottom and top of the seat and back cushions and are stitched together at the junction 173 along with a listing strip 174 which is secured by tacks, staples 175 or the like to the bottom cross member 136. The back trim material extends downwardly at 176 and is secured to the underside of the rear edge of the base frame 131 to enclose the rear area below the back cushion and to limit the upward movement of the back frame 134 to seating position.

It is to be understood that the leaf springs 142 and 149 may be tapered both in width and thickness to control the deflection of the rear portion of the seat and back cushions and prevent the rebounding of the seat cushion in case the seat is employed in an automotive vehicle. Since the rear ends of the spring strips 94 are secured to the guide strips 158 near the rear pivoted end thereof, the downward movement of the springs 94 apply the seating load to the guide strips and to the leaf spring 142. The leaf spring tends to rebound before the load on the spring strips 149 has bottomed and the override of the load on the spring strips counteract the tendency of the leaf springs 142 to throw an occupant from the seat. In other words, the occupant has a downward component of movement at the time the leaf springs 142 start to rebound from the applied shock load and the forces are substantially balanced so that the occupant is not thrown upwardly from the seat. Especially is this true when the vehicle is operating under off-road conditions.

The leaf springs 142 are disposed below the guide links 149 but the same result obtains in retaining the back cushion in its same vertical position during its downward and upward movements in view of the like arcs 156 and 157 over which the rear ends of the leaf springs and links pass during their travel.

In any of the constructions, the seat and back cushions are pivoted together to operate as a unit on leaf spring supporting elements which are disposed therebeneath. The rear portion of the leaf springs can be thinned or narrowed or both to control the degree of upward and downward movement occurring to the seat and back cushions when different loads are applied thereto. It is to be understood that the leaf spring may have any crosssection, square, rectangular, oval, round or the like so long as it deflects under load.

As is evidenced from FIGS. 1 through 5, a second leaf spring may be employed with each main leaf spring to pick up the deflection as the load increases so as to maintain the deflection substantially constant for variations in the loading thereof. The same result is obtained by the use of the extended supporting block 143 illustrated in FIG. 15. The deflection of the seat and back cushion in unison action without the tilting of the back cushion when moved vertically provides comfort to the seat and eliminates the movement of the clothes of the occupant on the rear cushion as occurs when the seat cushion deflects independently of the back cushion. The guide links slope upwardly and form a parallelogram arrangement with the leaf springs and any tilt to the back which would normally occur is offset by the opposite movement produced by the guide links as they move to horizontal position. With this arrangement even though the back cushion is tilted at an angle to the seat cushion, this angularity between the two cushions changes as both are deflected due to the action of the pivoted guide link, as pointed out hereinabove. A simple, rugged spring construction is mounted below the seat cushion within the side edges thereof so that unison action is provided whether or not arms or back frame structures are employed on the base unit. The seat is not only usable in chairs, davenports and the like but lends itself to vehicle seat application in

What is claimed is:

1. In a seat of the unison type, a base, a seat cushion and a back cushion secured together in pivotal relation, leaf springs supported on said base with the free end extending rearwardly beneath and pivotally connected to said back cushion, and links pivoted to the base and to said back cushion and extending below said seat cushion, said links and said base and said back cushion and said leaf springs forming a resilient parallelogram support for said seat cushion and said back cushion to maintain a desired angular relation of said back cushion relation to said base with deflection of said seat cushion.

2. The seat set forth in claim 1 and further including sinuous spring strips in said seat cushion and extending from the front to the rear thereof, means for securing the front end of the strips to the base, and a spring supporting element secured across the leaf springs near the rear end thereof having means for supporting the rear ends of the spring strips.

3. The seat set forth in claim 1 and further including spring supporting means on said back cushion, and sinuous spring strips in said seat cushion connected at the front end to the base and at the back end to said spring supporting means.

4. In a seat construction, a base, a pair of leaf springs supported on said base and extending rearwardly thereof, a back cushion element pivotally supported on the ends of said extending leaf springs, and links pivoted to said base and to the lower portion of said back cushion element at points spaced from said pivotal connection with said leaf springs, said leaf springs and said links and said back cushion element forming with said base a resilient parallelogram support for said seat construction to maintain a desired angular relation between said back cushion element and said base with deflection of said leaf springs.

5. The seat construction set forth in claim 4 and further including a second pair of leaf springs secured adjacent to said first pair of leaf springs for progressively picking up the load as the first leaf springs are deflected.

6. The seat construction set forth in claim 4 wherein said leaf springs are U-shaped having upper and lower legs, said leaf springs being secured to said base by said lower legs with said upper legs extending rearwardly, said back cushion element being pivotally secured to the ends of said upper rearwardly extending legs, and brackets on said base, said links pivotally connecting the lower portion of the back rest element to said brackets.

7. In a seating structure having a base and a plurality of seating areas, each seating area embodying a back cushion and a seat cushion, means for pivotally joining said cushions together, means pivotally supporting the forward portion of the seat cushion to said base, leaf springs disposed below the cushions, said leaf springs being secured to said base and extending rearwardly therefrom and being pivotally secured at the rearward ends thereof to said back cushion, said leaf springs supporting said cushions for downward deflection at the rear edge of the seat cushion, and link means pivotally connected to said base and to said back cushion for maintaining said back cushion in a desired angular relation relative to said base with deflection of said seat cushion.

8. The seating structure set forth in claim 7 and further including a bracket on said base, said link means interconnecting said brackets to said back cushion, and means for adjusting the position of said links relative to said brackets for tilting said back cushion relative to said seat cushion.

9. In a seat of the unison action type, a base, a back element, a seat element, a pair of spaced leaf springs having the front ends secured to the base and the rear ends pivotally secured to the back element, and a link pivotally secured to the base and to the back element and spaced from said pivotal connection between said back element and said leaf spring for maintaining said back element in desired angular position relative to the base.

10. The seat set forth in claim 9 and further including means on said back element for supporting the ends of sinuous spring strips, sinuous spring strips forming the base of said seat element and having the rear ends thereof secured to said means on said back element, and means for securing the front ends of the sinuous spring strips to the front end of the base.

11. The seat set forth in claim 9 and further including a spring supporting strip secured across the leaf springs adjacent to the back element, sinuous spring strips forming the base of said seat element having the rear ends secured to said spring supporting strip, and means for supporting the front ends of the sinuous spring strips to the forward portion of said base.

12. In the seat set forth in claim 9, said leaf springs being U-shaped and having upper and lower legs, a bracket, means for securing said bracket and lower leg of one of said leaf springs in spaced relation on said base, a bracket on said back element, a pivot joining the end of the upper leg of said one of said leaf springs to said last bracket, said link pivoted to the first and second brackets, a spring strip supporting element secured across the upper legs of said leaf springs adjacent to the back element, spring strips having the rear ends secured to said supporting element, and means for securing the front ends of said spring strips to the base.

13. In the seat set forth in claim 9, sinuous spring strips for said seat element having the rear ends secured adjacent to the extending ends of the leaf springs to move vertically with the back element on said leaf springs, and means for securing the front ends of the spring strips to the base.

14. The seat set forth in claim 9 and further including means for adjusting the pivotal position of one end of the links for changing the angular position of the back element.

15. The seat set forth in claim 14 wherein said adjusting means embodies a lead screw having a nut thereon to which one end of the links is secured, and means for rotating said lead screw.

16. The combination including supporting means for a seat unit having a base and seat and back element, of a pair of leaf spring members securable at one end to said base and at the other end to said seat and back element, a pair of guide link members, said members having means at one end for attachment to said base and apertures at the other end for attachment to said seat and back element to provide pivotal support, a spacer strip joinable to a pair of said members near said other ends thereof, and spring strips having one end securable to said spacer strip to extend towards the end of the members which are attachable to said base.

17. The combination including supporting means for a seat unit having a base and a seat and back element, of a pair of leaf spring members securable at one end to said base and at the other end to said seat and back element, a pair of guide link members, said members having means at one end for attachment to said base and apertures at the other end for attachment to said seat and back element to provide pivotal support, a spacer strip joinable to a pair of said members near said other ends thereof, spring strips having one end securable to said spacer strip to extend towards the end of the members which are attachable to the base, a pair of elements securable to said seat and back element adjacent said other ends of said members, and means for extending through said elements and the apertures in said members for pivotally spacing the ends of the members in relation to each other.

18. The combination including supporting means for a seat unit having a seat member and a back member, a base, a pair of leaf springs having one end secured to said base, a pair of guide links having one end secured to said base in vertically spaced relation to said leaf springs, and a pair of elements secured to said back member for pivotally connecting the free ends of said leaf springs and guide links, said leaf springs and said guide links and said elements forming with said base resilient parallelogram supports for said seat unit to maintain said back member in a desired angular relation to said base.

19. The combination set forth in claim 18 and further including a spacing strip connecting a pair of said members, and a plurality of spring strips having one end secured to said spacing strip to extend toward the ends of the leaf springs and guide links secured to said base.

20. In a seat construction, a base, a back cushion, a seat cushion, means for pivotally interconnecting said cushions near the adjacent edges thereof, a pair of leaf springs having one end secured to the base and the opposite end pivotally secured to said back cushion and a pair of guide links having one end pivoted to the base and the opposite end pivoted to said back cushions vertically spaced from the pivots joining the leaf springs thereto, said guide links having a vertical extending resilient portion at the pivoted end for permitting the tilting of the back cushion by the occupant as the links and the leaf springs tend to maintain the back cushion in substantially the same vertical position when the pivoted ends of the leaf springs and links are deflected.

References Cited by the Examiner

UNITED STATES PATENTS

| | | | |
|---|---|---|---|
| 1,788,088 | 1/1931 | Fabio | 297—361 |
| 2,100,475 | 11/1937 | Flint | 297—309 X |
| 2,100,476 | 11/1937 | Flint | 297—309 X |
| 2,303,036 | 11/1942 | Flint | 297—309 |
| 2,346,414 | 4/1944 | Carpenter | 297—309 |
| 2,537,071 | 1/1951 | Lukins | 297—296 X |
| 2,573,073 | 10/1951 | Vale | 297—301 X |
| 2,925,120 | 2/1960 | Flint | 297—302 |

FOREIGN PATENTS

| | | |
|---|---|---|
| 831,304 | 5/1938 | France. |
| 809,025 | 7/1951 | Germany. |

FRANK B. SHERRY, *Primary Examiner.*

R. B. FARLEY, *Assistant Examiner.*